(12) United States Patent
Chen et al.

(10) Patent No.: US 10,935,718 B2
(45) Date of Patent: *Mar. 2, 2021

(54) MULTIMODE OPTICAL FIBER TRANSMISSION SYSTEM INCLUDING SINGLE MODE FIBER

(71) Applicant: CORNING INCORPORATED, Corning, NY (US)

(72) Inventors: Xin Chen, Corning, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,436

(22) Filed: Mar. 23, 2020

(65) Prior Publication Data
US 2020/0218008 A1   Jul. 9, 2020

Related U.S. Application Data

(60) Division of application No. 16/160,262, filed on Oct. 15, 2018, now Pat. No. 10,690,844, which is a
(Continued)

(51) Int. Cl.
*G02B 6/02* (2006.01)
*H04B 10/60* (2013.01)
(Continued)

(52) U.S. Cl.
CPC ....... *G02B 6/02047* (2013.01); *G02B 6/0288* (2013.01); *G02B 6/0365* (2013.01);
(Continued)

(58) Field of Classification Search
None
See application file for complete search history.

(56) References Cited

U.S. PATENT DOCUMENTS

| 4,185,890 A | 1/1980 | Onoda et al. |
| 4,715,695 A | 12/1987 | Nishimura et al. |

(Continued)

FOREIGN PATENT DOCUMENTS

| CN | 1403837 A | 3/2003 |
| EP | 2639606 A2 | 9/2013 |
| WO | 2015126895 A1 | 8/2015 |

OTHER PUBLICATIONS

Downie et al. "Transmission of 112 Gb/s PM-QPSK signals over up to 635 km of multimode optical fiber" , Opt Express. Dec. 12, 2011;19 (26):B363-9 22274044.
(Continued)

*Primary Examiner* — Darren E Wolf
(74) *Attorney, Agent, or Firm* — Smit Kapadia

(57) ABSTRACT

Some embodiments of the disclosure relate to an optical transmission system that operates at a wavelength in the range from 950 nm to 1600 nm and that employs a single-mode optical transmitter and an optical receiver optically coupled to respective ends of a multimode fiber designed for 850 nm multimode operation. The optical transmission system also employs at least one single mode fiber situated within the optical pathway between the optical transmitter and the receiver and coupled to the multimode fiber.

3 Claims, 7 Drawing Sheets

Related U.S. Application Data continuation of application No. 15/590,532, filed on May 9, 2017, now Pat. No. 10,241,259, which is a division of application No. 14/703,099, filed on May 4, 2015, now Pat. No. 9,678,269.

(60) Provisional application No. 61/994,431, filed on May 16, 2014.

(51) Int. Cl.
*H04B 10/50* (2013.01)
*H04B 10/2581* (2013.01)
*G02B 6/036* (2006.01)
*G02B 6/26* (2006.01)
*G02B 6/028* (2006.01)

(52) U.S. Cl.
CPC ......... *G02B 6/268* (2013.01); *H04B 10/2581* (2013.01); *H04B 10/50* (2013.01); *H04B 10/60* (2013.01)

(56) References Cited

U.S. PATENT DOCUMENTS

| | | | |
|---|---|---|---|
| 5,146,526 A * | 9/1992 | Sweeney | G02B 6/32 385/90 |
| 5,159,481 A * | 10/1992 | Maeda | H04B 10/2581 385/11 |
| 5,361,319 A | 11/1994 | Antos et al. | |
| 5,416,862 A * | 5/1995 | Haas | G02B 6/24 385/27 |
| 7,336,877 B2 | 2/2008 | Bickham | |
| 7,773,845 B2 | 8/2010 | Imamura | |
| 7,787,731 B2 | 8/2010 | Bookbinder et al. | |
| 7,865,050 B1 | 1/2011 | Sun | |
| 8,189,978 B1 | 5/2012 | Bennett et al. | |
| 8,290,323 B2 | 10/2012 | Donlagic | |
| 8,493,555 B2 | 7/2013 | Li et al. | |
| 8,493,556 B2 | 7/2013 | Li et al. | |
| 8,737,792 B2 | 5/2014 | Fini et al. | |
| 8,768,131 B2 | 7/2014 | Chen et al. | |
| 8,842,957 B2 | 9/2014 | Bickham et al. | |
| 9,151,888 B2 | 10/2015 | Mori et al. | |
| 9,197,030 B2 | 11/2015 | Bennett et al. | |
| 9,868,149 B2 | 1/2018 | Recknagel et al. | |
| 9,869,814 B2 | 1/2018 | Molin et al. | |
| 10,007,055 B2 | 6/2018 | Sillard et al. | |
| 10,082,622 B2 | 9/2018 | Bookbinder et al. | |
| 10,094,973 B2 | 10/2018 | Bickham et al. | |
| 10,241,259 B2 | 3/2019 | Chen et al. | |
| 2001/0031121 A1 * | 10/2001 | Kim | G02B 6/0288 385/124 |
| 2004/0042749 A1 | 3/2004 | Mukasa | |
| 2005/0063653 A1 | 3/2005 | Matthijse et al. | |
| 2005/0207714 A1 | 9/2005 | Koike et al. | |
| 2006/0045450 A1 | 3/2006 | Bickham | |
| 2009/0019894 A1 | 1/2009 | Matthijse et al. | |
| 2010/0098112 A1 * | 4/2010 | Gapontsev | H01S 3/0675 372/3 |
| 2010/0220966 A1 | 9/2010 | Bennett | |
| 2011/0274398 A1 | 11/2011 | Fini et al. | |
| 2011/0286711 A1 * | 11/2011 | Oyamada | G02B 6/03627 385/126 |
| 2013/0039626 A1 | 2/2013 | Bickham et al. | |
| 2013/0071114 A1 | 3/2013 | Bickham et al. | |
| 2013/0077926 A1 | 3/2013 | Bickham et al. | |
| 2013/0243382 A1 | 9/2013 | Li et al. | |
| 2014/0036348 A1 | 2/2014 | Bennett et al. | |
| 2014/0086577 A1 | 3/2014 | Chen et al. | |
| 2014/0086578 A1 | 3/2014 | Bickham et al. | |
| 2014/0119701 A1 | 5/2014 | Chen et al. | |
| 2014/0341520 A1 | 11/2014 | Matthijse et al. | |
| 2015/0205039 A1 | 7/2015 | Molin et al. | |
| 2015/0241628 A1 | 8/2015 | Dong et al. | |
| 2015/0316713 A1 * | 11/2015 | Yamamoto | G02B 6/02276 385/127 |
| 2015/0333829 A1 | 11/2015 | Chen et al. | |
| 2015/0362671 A1 | 12/2015 | Bell | |
| 2016/0091660 A1 | 3/2016 | Li et al. | |
| 2016/0154175 A1 | 6/2016 | Downie et al. | |
| 2016/0187576 A1 | 6/2016 | Sasaki et al. | |
| 2017/0068046 A1 | 3/2017 | Bickham et al. | |
| 2017/0242185 A1 | 8/2017 | Chen et al. | |
| 2017/0336559 A1 | 11/2017 | Bookbinder et al. | |
| 2019/0049659 A1 | 2/2019 | Chen et al. | |

OTHER PUBLICATIONS

Lenahan, "Calculation of Modes in an Optical Fiber Using the Finite Element Method and EISPACK," Bell Sys. Tech. J., vol. 62, pp. 2663-2695 (1983.

Mode Field Diameter (MFD) ", Publication date unknown, retrieved Feb. 10, 2020, Fiberpaedia, 2 pgs. (https://www.fibercore.com/expertise/fiberpaedia/mode/field/diameter-mfd".

Sorin et al. "Interoperability of single-mode and multimode data links for data center and optical backplane applications" , OFC/NFOEC Technical Digest 2013, OW1B.6.

Dr. Rudiger Paschotta, "V number"; Publication date unknown, 3 pgs—retrieved from the internet on Feb. 10, 2020; RP Photonics Encyclopedia. (https://www.rp-photonics.com/v_number.html.

* cited by examiner

MULTIMODE OPTICAL FIBER TRANSMISSION SYSTEM INCLUDING SINGLE MODE FIBER

RELATED APPLICATIONS

This application is a divisional and claims the benefit of priority under 35 U.S.C. § 120 of U.S. patent application Ser. No. 16/160,262, filed on Oct. 15, 2018, which a continuation application of U.S. application Ser. No. 15/590,532, filed on May 9, 2017 which is a divisional application of U.S. application Ser. No. 14/703,099, filed on May 4, 2015 which in turn claims the benefit of priority to U.S. Provisional Application No. 61/994,431, filed on May 16, 2014. The entire teachings of the above applications are incorporated herein by reference.

FIELD

The present disclosure relates to optical transmission systems that employ multimode optical fiber, and in particular relates to the use of at least one single mode fiber optically coupled to the multimode optical fiber.

BACKGROUND

No admission is made that any reference cited herein constitutes prior art. Applicant expressly reserves the right to challenge the accuracy and pertinence of any cited documents.

Optical fiber transmission systems are employed in data centers to optically connect one optical device (e.g., a router, a server, a switch, etc.) with another set of optical devices.

Current data centers are configured with multimode optical fibers coupled to 850 nm multimode VCSELs (Vertical Cavity Surface Emitting Lasers) light sources that provide modulated data signals to the multimode fibers. Such multimode fibers are used because the light sources in the transceivers in the optical devices are multimode light sources. Also, historically it has been easier to work with multimode fiber than single-mode fiber. Unfortunately, multimode fiber has a smaller bandwidth-distance product due to mode dispersion, which makes it difficult and expensive to extend the reach of the optical fiber transmission system while maintaining high-bandwidth transmission. Furthermore, utilizing a typical transmitter (that utilizes a 850 nm VCSEL) operating at 10 Gb/s as a source, current standard OM3 and OM4 multimode optical fibers can transmit optical signal over a distance of only about 300 m to about 500 m, due to signal distortion caused by the chromatic dispersion introduced by silica material of these multimode fibers. As optical transmission speed moves to 25 Gb/s or higher, this distance becomes even shorter (75 m to 150 m) due to chromatic dispersion for the current standard OM3 and OM4 multimode optical fibers operating at around 850 nm. Consequently, other ways of increasing the transmission distance of the optical fiber transmission system without incurring the time, labor and expense having to replace the existing multimode optical fiber are needed.

SUMMARY

Some embodiments of the disclosure relate to an optical transmission system that operates at a wavelength in the range from 950 nm to 1600 nm and employs a single-mode optical transmitter and an optical receiver optically coupled to respective ends of a multimode fiber designed for 850 nm multimode operation. The optical transmission system also employs at least one single mode fiber situated within the optical pathway between the optical transmitter and the receiver, and coupled to the multimode fiber.

One embodiment of the disclosure relates to an optical transmission system that comprises:

a single-mode transmitter that generates modulated light having an operating wavelength $\lambda_O$ between 950 nm and 1600 nm;

an optical receiver configured to receive and detect the modulated light;

a multimode optical fiber that defines an optical pathway between the single-mode transmitter and the optical receiver, the multimode optical fiber having a core with a diameter $D_{40}$ and a refractive index profile configured to optimally transmit light at a wavelength $\lambda 1$ situated between 840 nm and 860 nm and to propagate light in the LP01 mode at the operating wavelength $\lambda_O$, the multimode fiber has a LP01 mode field diameter $LP01MFD_{MM\lambda_O}$ and a cutoff wavelength>1600 nm; and at least one single mode fiber, at the operating wavelength $\lambda_O$; the at least one single mode fiber operably disposed in the optical pathway and situated between the single-mode transmitter and the receiver, the at least one single mode fiber having cutoff wavelength $\lambda_{SM}$<1600 nm, and a length in the range from 1 cm to 20 m, and a core diameter $D_{SM}$, and wherein $D_{SM}$<$D_{40}$, and the mode field diameter $MFD_{SM}$ of the single mode fiber at the wavelength $\lambda_O$ is $0.7MFD_{SM}$<LP01 $MFD_{MM\lambda_O}$<$1.3MFD_{SM}$. In some embodiments $0.8MFD_{SM}$<LP01 $MFD_{MM\lambda_O}$<$1.2MFD_{SM}$. In some embodiments $0.9MFD_{SM}$<LP01 $MFD_{MM\lambda_O}$<$1.1MFD_{SM}$. In some exemplary embodiments the length of the single mode fiber is 5 cm to 20 m. In some embodiments 12 µm<$MFD_{SM}$<18 µm, and/or said single mode fiber comprises a core diameter $D_{SM}$ of 15≤$D_{SM}$≤25 µm, and a relative refractive core delta 0.8% to 0.25%.

According to some embodiments, the multimode fiber is multimoded at 980 nm, 1060 nm, and/or 1310 nm and/or at 1550 nm, but propagates one or more of these wavelengths in the LP01 mode. According to some embodiments, 12 µm<LP01 $MFD_{MM\lambda_O}$<15 µm, and $\lambda_O$ is between 950 nm and 1080 nm (e.g., 980 nm or 1060 nm). According to some embodiments, 14 µm<LP01 $MFD_{MM\lambda_O}$<16 µm, and $\lambda_O$ is between 1260 nm and 1340 nm. According to some embodiments, 14 µm<LP01 $MFD_{MM\lambda_O}$<16 µm, and $\lambda_O$ is between 1320 nm and 1340 nm. According to another embodiment, 14 µm<LP01 $MFD_{MM\lambda_O}$<16 µm and $\lambda_O$ is between 1540 nm and 1560 nm.

According to one embodiment, 14 µm<LP01 $MFD_{MM\lambda_O}$<16 µm and $\lambda_O$ is between 1320 nm and 1340 nm. According to another embodiment, 14 µm<LP01 $MFD_{MM\lambda_O}$<16 µm and $\lambda_O$ is between 1540 nm and 1560 nm. According to yet another embodiment 14 µm<LP01 $MFD_{MM\lambda_O}$<16 µm, and 13 µm<$MFD_{SM}$<19 µm.

According to some embodiments an optical transmission system comprises:

a multimode transmitter that generates modulated light having an operating wavelength $\lambda_1$ situated between 840 nm and 860 nm;

an optical receiver configured to receive and detect the modulated light;

a multimode optical fiber that defines an optical pathway between the multimode transmitter and the optical receiver, the multimode optical fiber having a core with a diameter $D_{40}$ and a refractive index profile configured to optimally transmit light at wavelength $\lambda_1$ situated between 840 nm and 860 nm, and to propagate the LP01 optical mode at another wavelength $\lambda_O$, where $\lambda_O > 950$ nm, the multimode fiber having a LP01 mode field diameter LP01MFD$_{MM\lambda0}$ and 8.5 µm<LP01MFD$_{MM\lambda0}$<11 µm. According to one exemplary embodiment, $\lambda_O$ is between 1320 nm and 1360 nm. According to another exemplary embodiment $\lambda_O$ is situated between 1540 nm and 1560 nm.

According to some embodiments an optical transmission system comprises:

a single mode transmitter that generates modulated light having an operating wavelength $\lambda_O$ between 950 nm and 1600 nm;

an optical receiver configured to receive and detect the modulated light;

a multimode optical fiber that defines an optical pathway between the multimode transmitter and the optical receiver, the multimode optical fiber having a core with a diameter $D_{40}$ and a refractive index profile configured to optimally transmit light at a nominal wavelength at wavelength $\lambda_1$ situated between 840 nm and 860 nm and to propagate the LP01 mode at another wavelength $\lambda_O$, where $\lambda_O > 950$ nm, the multimode fiber has a LP01 mode field diameter LP01MFD$_{MM\lambda0}$ and 8.5 µm<LP01MFD$_{MM\lambda0}$<11 µm; and at least one single mode fiber operably disposed in the optical pathway and situated between the single-mode transmitter and said multimode optical fiber and having a length in the range from 5 cm to 20 m, wherein the single mode fiber has a mode field diameter MFD$_{SM}$ at the operating wavelength $\lambda_O$, such that 0.7MFD$_{SM}$<LP01 MFD$_{MM\lambda0}$<1.3MFD$_{SM}$. In some embodiments 0.8MFD$_{SM}$<LP01 MFD$_{MM\lambda0}$<1.2MFD$_{SM}$. In some embodiments 0.9MFD$_{SM}$<LP01 MFD$_{MM\lambda0}$<1.1MFD$_{SM}$. According to one exemplary embodiment, $\lambda_O$ is between 1320 nm and 1340 nm. According to another exemplary embodiment $\lambda_O$ is situated between 1540 nm and 1560 nm. In some embodiments, 12 µm<MFD$_{SM}$<18 µm, and/or said single mode fiber comprises a core diameter $D_{SM}$ of 15≤$D_{SM}$≤25 µm, and a relative refractive core delta 0.8% to 0.25%.

According to some embodiments the multimode fiber has a modal bandwidth of at least 2.5 GHz·Km at a wavelength $\lambda_1$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated into and constitute a part of this specification. The drawings illustrate one or more embodiment(s), and together with the description serve to explain principles and operation of the various embodiments.

DETAILED DESCRIPTION

Figure 1A:
FIG. 1A is a schematic diagram of one embodiment of optical fiber transmission system that employs a multimode transmitter and a single receiver optically connected by a multimode optical fiber 40.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index" is defined as $\Delta = 100 \times [n(r)^2 - n_{cl}^2]/2n(r)^2$, where $n(r)$ is the refractive index at the radial distance r from the fiber's centerline, unless otherwise specified, and $n_{cl}$ is the average refractive index of the outer cladding region of the cladding at a wavelength of 850 nm, which can be calculated, for example, by taking "N" index measurements ($n_{C1}, n_{C2}, \ldots n_{CN}$) in the outer annular region of the cladding, and calculating the average refractive index by:

measurements ($n_{C1}, n_{C2}, \ldots n_{CN}$) in the outer annular region of the cladding, and calculating the average refractive index by:

$$n_C = (1/N) \sum_{i=1}^{i=N} n_{Ci}.$$

In some exemplary embodiments, the outer cladding region comprises essentially pure silica. As used herein, the relative refractive index is represented by delta or $\Delta$ and its values are typically given in units of "%," unless otherwise specified. In cases where the refractive index of a region is less than that of the average refractive index of the outer cladding region, the relative index percent is negative and is referred to as having a depressed index, and is calculated at the point at which the relative index is most negative unless otherwise specified. In cases where the refractive index of a region is greater than the refractive index of average refractive index of the outer cladding region, the relative index percent is positive and the region can be said to be raised or to have a positive index, and is calculated at the point at which the relative index is most positive, unless otherwise specified. With reference to core delta value, it is disclosed herein as maximum % delta.

An "up-dopant" is herein considered to be a dopant which has a propensity to raise the refractive index relative to pure undoped $SiO_2$. A "down-dopant" is herein considered to be a dopant which has a propensity to lower the refractive index relative to pure undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

Unless otherwise stated, the overfill (or overfilled (OFL)) bandwidth (BW) of an optical fiber is defined herein as measured using overfilled launch conditions at 850 nm according to IEC 60793-1-41 (TIA-FOTP-204), Measurement Methods and Test Procedures: Bandwidth. In the discussion below, bandwidth BW is understood to mean overfilled bandwidth unless otherwise indicated.

The minimum calculated effective modal bandwidth (EBW) can be obtained from measured differential mode delay spectra as specified by IEC 60793-1-49 (TIA/EIA-455-220), Measurement Methods and Test Procedures: Differential Mode Delay.

The NA of an optical fiber means the numerical aperture as measured using the method set forth in IEC-60793-1-43 (TIA SP3-2839-URV2 FOTP-177) titled "Measurement Methods and Test Procedures: Numerical Aperture".

The modeled bandwidth may be calculated according to the procedure outlined in T. A. Lenahan, "Calculation of Modes in an Optical Fiber Using the Finite Element Method and EISPACK," Bell Sys. Tech. J., vol. 62, pp. 2663-2695 (1983), the entire disclosure of which is hereby incorporated herein by reference. Equation 47 of this reference is used to calculate the modal delays; however note that the term $dk_{clad}/d\omega^2$ must be replaced with $dk^2_{clad}/d\omega^2$, where $k_{clad}=2\pi^*n_{clad}/\lambda$ and $\omega=2\pi/\lambda$, and $n_{clad}=nc$ where is the average index of refraction of the outer cladding region. The modal delays are typically normalized per unit length and given in units of ns/km (or equivalently in units of ps/m). The calculated bandwidths also assume that the refractive index profile is ideal, with no perturbations such as a centerline dip, and as a result, represent the maximum bandwidth for a given design.

The term graded index, "α-profile" or "alpha profile," as used herein, refers to a relative refractive index profile, expressed in terms of Δ which is in units of "%", where r is the radius and which follows the equation, $$\Delta(r) = \Delta_0 \left[1 - \left(\frac{r}{R_1}\right)^\alpha\right],$$

where $\Delta_0$ is the relative refractive index extrapolated to r=0, $R_1$ is the radius of the core (i.e. the radius at which Δ(r) is zero), and α is an exponent which is a real number. For a step index profile, the alpha value is greater than or equal to 10. For a graded index profile, the alpha value is less than 10. The term "parabolic," as used herein, includes substantially parabolically shaped refractive index profiles which may vary slightly from an α value of, for example, 2.0 at one or more points in the core, as well as profiles with minor variations and/or a centerline dip. The modeled refractive index profiles that exemplify the invention have graded index cores which are perfect alpha profiles. An actual fiber will typically have minor deviations from a perfect alpha profile, including features such as dips or spikes at the centerline and/or a diffusion tail at the outer interface of the core. However accurate values of alpha and $\Delta_0$ may still be obtained by numerically fitting the measured relative refractive index profile to an alpha profile over the radius range from $0.05\,R_1 \le r \le 0.95\,R_1$. In ideal graded index fibers with no imperfections such as dips or spikes at the centerline, $\Delta_0=\Delta_{1MAX}$, where $\Delta_{1MAX}$ is the maximum refractive index of the core. In other cases, the value from $\Delta_0$ obtained from the numerical fit from $0.05\,R_1 \le r \le 0.95\,R_1$ may be greater or less than $\Delta_{1MAX}$.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index" is defined as $\Delta=100\times[n(r)^2 - n_{cl}^2]/2n(r)^2$, where n(r) is the refractive index at the radial distance r from the fiber's centerline, unless otherwise specified, and $n_{cl}$ is the average refractive index of the outer cladding region of the cladding at a wavelength of 850 nm, which can be calculated, for example, by taking "N" index measurements ($n_{C1}, n_{C2}, \ldots n_{CN}$) in the outer annular region of the cladding, and calculating the average refractive index by:

measurements ($n_{C1}, n_{C2}, \ldots n_{CN}$) in the outer annular region of the cladding, and calculating the average refractive index by:

$$n_C = (1/N)\sum_{i=1}^{i=N} n_{Ci}.$$

In some exemplary embodiments, the outer cladding region comprises essentially pure silica. As used herein, the relative refractive index is represented by delta or Δ and its values are typically given in units of "%," unless otherwise specified. In cases where the refractive index of a region is less than that of the average refractive index of the outer cladding region, the relative index percent is negative and is referred to as having a depressed index, and is calculated at the point at which the relative index is most negative unless otherwise specified. In cases where the refractive index of a region is greater than the refractive index of average refractive index of the outer cladding region, the relative index percent is positive and the region can be said to be raised or to have a positive index, and is calculated at the point at which the relative index is most positive, unless otherwise specified. With reference to core delta value, it is disclosed herein as maximum % delta.

An "up-dopant" is herein considered to be a dopant which has a propensity to raise the refractive index relative to pure undoped $SiO_2$. A "down-dopant" is herein considered to be a dopant which has a propensity to lower the refractive index relative to pure undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

Unless otherwise stated, the overfill (or overfilled (OFL)) bandwidth (BW) of an optical fiber is defined herein as measured using overfilled launch conditions at 850 nm according to IEC 60793-1-41 (TIA-FOTP-204), Measurement Methods and Test Procedures: Bandwidth. In the discussion below, bandwidth BW is understood to mean overfilled bandwidth unless otherwise indicated.

The minimum calculated effective modal bandwidth (EBW) can be obtained from measured differential mode delay spectra as specified by IEC 60793-1-49 (TIA/EIA-455-220), Measurement Methods and Test Procedures: Differential Mode Delay.

The NA of an optical fiber means the numerical aperture as measured using the method set forth in IEC-60793-1-43 (TIA SP3-2839-URV2 FOTP-177) titled "Measurement Methods and Test Procedures: Numerical Aperture".

The modeled bandwidth may be calculated according to the procedure outlined in T. A. Lenahan, "Calculation of Modes in an Optical Fiber Using the Finite Element Method and EISPACK," Bell Sys. Tech. J., vol. 62, pp. 2663-2695 (1983), the entire disclosure of which is hereby incorporated herein by reference. Equation 47 of this reference is used to calculate the modal delays; however note that the term $dk_{clad}/d\omega^2$ must be replaced with $dk^2_{clad}/d\omega^2$, where $k_{clad}=2\pi*n_{clad}/\lambda$ and $\omega=2\pi/\lambda$, and $n_{clad}=nc$ where is the average index of refraction of the outer cladding region. The modal delays are typically normalized per unit length and given in units of ns/km (or equivalently in units of ps/m). The calculated bandwidths also assume that the refractive index profile is ideal, with no perturbations such as a centerline dip, and as a result, represent the maximum bandwidth for a given design.

The term graded index, "α-profile" or "alpha profile," as used herein, refers to a relative refractive index profile, expressed in terms of $\Delta$ which is in units of "%", where r is the radius and which follows the equation, $$\Delta(r) = \Delta_0 \left[ 1 - \left( \frac{r}{R_1} \right)^\alpha \right],$$

where $\Delta_0$ is the relative refractive index extrapolated to r=0, $R_1$ is the radius of the core (i.e. the radius at which $\Delta(r)$ is zero), and α is an exponent which is a real number. For a step index profile, the alpha value is greater than or equal to 10. For a graded index profile, the alpha value is less than 10. The term "parabolic," as used herein, includes substantially parabolically shaped refractive index profiles which may vary slightly from an α value of, for example, 2.0 at one or more points in the core, as well as profiles with minor variations and/or a centerline dip. The modeled refractive index profiles that exemplify the invention have graded index cores which are perfect alpha profiles. An actual fiber will typically have minor deviations from a perfect alpha profile, including features such as dips or spikes at the centerline and/or a diffusion tail at the outer interface of the core. However accurate values of alpha and $\Delta_0$ may still be obtained by numerically fitting the measured relative refractive index profile to an alpha profile over the radius range from $0.05 R_1 \leq r \leq 0.95 R_1$. In ideal graded index fibers with no imperfections such as dips or spikes at the centerline, $\Delta_0 = \Delta_{1MAX}$, where $\Delta_{1MAX}$ is the maximum refractive index of the core. In other cases, the value from $\Delta_0$ obtained from the numerical fit from $0.05 R_1 \leq r \leq 0.95 R_1$ may be greater or less than $\Delta_{1MAX}$.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Various embodiments will be further clarified by the following examples.

At least one embodiment of the disclosure relates to an optical transmission system 10, 10' that includes a multimode fiber (MMF) 40, 40'. The multimode fiber 40, 40' can operate both at a signal wavelength $\lambda_1$ situated in a 840 nm-860 nm wavelength range (e.g., 845 nm<$\lambda_1$<855 nm range, 850 nm) for multimode (MM) transmission, and at a longer wavelength $\lambda_0$ (for example, 980 nm, 1060 nm, 1310 nm, or 1550 nm) for essentially a single mode (SM) transmission. It is desirable for the optical transmission systems 10 to have an operating wavelength $\lambda_0$ longer than 950 nm (e.g., 980 nm, 1060 nm, 1310 nm or 1550 nm), in order to lower chromatic dispersion due to the silica material of the optical fiber. Thus, because the multimode fibers 40, 40' in the embodiments of the optical transmission systems disclosed herein are capable of operating at both 850 nm for multimode transmission and at a longer wavelength $\lambda_0$ (i.e., $\lambda_0 > \lambda_1$, where $\lambda_0 - \lambda_1 > 100$ nm) for single mode transmission, they can be used with a commonly utilized 850 nm VCSELs (Vertical Cavity Surface Emitting Lasers), and at a later time the optical transmission system can be advantageously upgraded by replacing 850 nm VCSEL with a longer wavelength (e.g., $\lambda_0 > 950$ nm) light source, without replacing the multimode fiber(s) that is(are) already laid down. The longer wavelength light source can be, for example, 980 nm, 1060 nm, 1310 nm or 1550 VCSELs, or a silicon photonics laser source operating at either 1310 nm or 1550 nm, or a DFB (distributed feed-back) laser operating at 950 nm to 1600 nm wavelength.

For example, in some embodiments of the optical transmission system 10, the longer wavelength light source that provides optical signals at the wavelength $\lambda_0 > 950$ nm is optically coupled to a relatively short length (e.g., 0.01 m to 20 m) of a single mode fiber (SMF) 50, 50'. For example, the relatively short length of SMF 50, 50' may be in the form of a 0.01 m to 0.2 m SMF fiber stub type connector, or 0.5 m to 2 m in SMF jumper. The single mode fiber (SMF) 50, 50' in turn can be directly coupled to the multimode fiber 40, 40' described herein. The longer wavelength light source and the SMF 50, could be provided, for example, in a single module, to be easily coupled to the MMF 40', 40. The upgraded optical transmission system 10 of these embodiments utilizes at least one multimode fiber MMF 40, 40' optimized for multimode transmission in 840 to 860 nm wavelength range (for example at $\lambda_1$=850 nm) and at least one single mode fiber SMF 50', 50 capable of SM transmission at a wavelength $\lambda_0$>950 nm, coupled to the multimode fiber(s) 40, 40'. The multimode fiber 40, 40' is structured to propagate light at the wavelength $\lambda_0$ in the LP01 mode and to have the mode field diameter of LP01 optical mode approximately equal (±30%, more preferably ±20%) to the mode field diameter of the SM fiber 50, 50'. The SM fiber 50, 50' is optically coupled to the transiver 20, 30. The coupling loss from the LP01 mode of SMF to the LP01 mode of the MMF depends on the mode field diameters (MFD). The coupling loss CL due to MFD mismatch can be calculated using $$CL = -10\log\left[\frac{4}{(MFD_{SM}/MFD_{MM} + MFD_{MM}/MFD_{SM})^2}\right]$$

The mode field diameter mismatch of not greater than ±30% helps to keep the coupling loss not greater than 0.5 dB due MFD mismatch. For example, the SMF 50', 50 may be situated between the transmitter 20 (containing a light source operating at a wavelength longer than 950 nm) and the MMF 40, 40'. However, it may also be situated between the receiver 30 and the MMF 40, 40'. In some embodiments of the optical system 10 the MMF 40, 40' is 100 m to 1000 m long.

In some exemplary embodiments the single mode fiber 50, 50' is single moded at 1310 nm, and the multimode fiber 40, 40' is structured to have mode field diameter (MFD) such that the LP01 mode propagating through the multimode fiber at 1310 nm is approximately equal to the MFD of the single mode fiber 50, 50' at this wavelength (i.e., ±30%, or $0.7MFD_{SM}$<LP01 $MFD_{MM}$<$1.3MFD_{SM}$ at $\lambda_0$=1310 nm). In some embodiments $0.8MFD_{SM}$<LP01 $MFD_{MM,\lambda_0}$<$1.2MFD_{SM}$, and in some embodiments $0.9MFD_{SM}$<LP01 $MFD_{MM\,\lambda_0}$<$1.1MFD_{SM}$ at $\lambda_0$=1310 nm.

Also, for example, in some embodiments the single mode fiber 50, 50' is a single mode fiber at 1060 nm, and the multimode fiber 40, 40' is structured to have mode field diameter (MFD) such that the LP01 mode propagating through the multimode fiber at $\lambda_0$ of about 1060 nm is approximately equal to that of the single mode fiber 50, 50' (i.e., ±30%, or $0.7MFD_{SM}$<LP01 $MFD_{MM}$<$1.3MFD_{SM}$ at $\lambda_0$). In some embodiments $0.8MFD_{SM}$<LP01 $MFD_{MM,\lambda_0}$<$1.2MFD_{SM}$, and in some embodiments $0.9MFD_{SM}$<LP01 $MFD_{MM\,\lambda_0}$<$1.1MFD_{SM}$ at $\lambda_0$=1060 nm. In some embodiments of the SMF 50, 12 µm<$MFD_{SM}$<18 µm, and/or the single mode fiber 50 comprises a core diameter $D_{SM}$ of 15≤$D_{SM}$≤25 µm, and a relative refractive core delta 0.8% to 0.25%.

Also, for example, in some embodiments the single mode fiber 50, 50' is a single mode fiber at $\lambda_0$=1550 nm, and the multimode fiber 40, 40' is structured to have mode field diameter (MFD) such that the LP01 mode propagating through the multimode fiber at $\lambda_0$=1550 nm is approximately equal to that of the single mode fiber 50, 50' (i.e., ±30%, or $0.7MFD_{SM}$<LP01 $MFD_{MM}$<$1.2MFD_{SM}$ at $\lambda_0$=1550 nm). In some embodiments $0.8MFD_{SM}$<LP01 $MFD_{MM,\lambda_0}$<$1.2MFD_{SM}$, and in some embodiments $0.9MFD_{SM}$<LP01 $MFD_{MM\,\lambda_0}$<$1.1MFD_{SM}$ at $\lambda_0$=1550 nm.

Also, for example, in some embodiments the optical fiber 50, 50' is multimoded at a wavelength $\lambda_1$ and propagates light in the LP01 mode at 980 nm, or 1060 nm, or 1310 nm, or 1550 nm wavelength, or another wavelength $\lambda_0$ where $\lambda_0$-$\lambda_1$>100 nm, and the multimode fiber is structured to have a mode field diameter such that the LP01 optical mode propagating through the multimode fiber 40, 40' at this wavelength is approximately equal (±30%, more preferably 20%, and even more preferably 10%) to that of MFD of the single mode fiber 50, 50' at that wavelength, to minimize coupling loses between the MMF and the SMF. Thus, according to these embodiments a multimode fiber 40, 40' can be used in the optical transmission system 10 for both transmission of signals provided by the 850 nm VCSEL light source(s), and for the single mode transmission of signal light provided to it from the single mode fiber, and the optical transmission system 10 advantageously does not require coupling devices utilizing mode converting lenses between the single mode fiber and the multimode fiber. For example, the SMF and the MMF can be advantageously spliced to one another, or butt coupled to one another, without the needing to have an intervening lens element therebetween.

According to some embodiments multimode fiber 40, 40' can be used in the optical transmission system 10 for both transmission of signals provided by the VCSEL light source (s) at the wavelength $\lambda_1$ (for example at $\lambda_1$=850 nm), as well as for the single mode (LP01 mode at the wavelength $\lambda_0$) transmission to the single mode fiber 50, 50' wherein the single mode fiber 50, 50' is situated between the MM fiber and the receiver. In these embodiments $\lambda_0$-$\lambda_1$>100 nm. In this embodiment, for example, the multimode fiber and the single mode fiber may be in physical contact with one another, or may be coupled with an index matching fluid or adhesive therebetween, or may be separated by a small air gap d (e.g., d<1 mm). The optical fiber(s) 50, 50', 40, 40' are structured such that $0.7MFD_{SM}$<LP01 $MFD_{MM}$<$1.3MFD_{SM}$ at $\lambda_0$. Hence in this embodiment the single mode fiber 50, 50' strips the higher order optical modes before they propagate further into the optical system 10 (while allowing the light in LP01 mode to propagate through). In these embodiments, advantageously, the optical transmission system 10 does not require coupling devices utilizing mode converting/matching lenses situated between the single mode fiber 50, 50' and the multimode fiber 40, 40'.

Some embodiments of the disclosure relate to an optical transmission system 10 that operates at a wavelength in the range from 950 nm to 1600 nm and that employs a single-mode optical transmitter and an optical receiver optically coupled to respective ends of a multimode fiber designed for 850 nm multimode operation. The optical transmission system 10 employs at least one single mode fiber 50, 50' within the optical pathway between the optical transmitter and the receiver 20 and 30. In these embodiments the single mode fiber 50, 50' ensures that only light from LP01 mode at the wavelength is transmitted through the system, thereby advantageously enabling a system bandwidth of greater than 10 GHz·km. The single mode fiber 50, 50' can have a relatively short length L, e.g., 1 cm to 5 m, or 50 cm to 5 m. In some embodiments of the SMF 50, 12 µm<$MFD_{SM}$<18 µm, and/or the single mode fiber 50 comprises a core diameter $D_{SM}$ of 15≤$D_{SM}$≤25 µm, and a relative refractive core delta 0.8% to 0.25%.

According to some exemplary embodiments, the physical core diameter $D_{SM}$ of the single mode fiber 50' is from 8.0 µm to 9.5 µm and this fiber is coupled to the multimode fiber 40. In this embodiment the multimode fiber 40 has a relatively small core diameter $D_{40}$, for example, 14 µm to 30 µm (and in some embodiments 15 µm≤$D_{40}$≤23 µm) which is smaller than the 50 μm or the 62.5 μm diameters of conventional MMF used in transmission systems.

According to other embodiments the physical core diameter $D_{SM}$ of single mode fiber 50 is larger than that of the conventional SMF and has a lower core delta (e.g. 0.1% to 0.25%) than that of the conventional SMF. For example physical core diameter $D_{SM}$ of single mode fiber 50 is 14 μm and this SMF 50 can be coupled to the multimode fiber 40'. The multimode fiber 40' of these embodiments has a core diameter $D_{40}$, for example of 50 μm or 62.5 μm.

The single mode fiber 50, 50' can be integrated within the optical path in any of the components that define the optical path. For example, the single mode fiber 50, 50' can be coupled to the transmitter 20 and/or the receiver 30. The single mode fiber 50, 50' can be spliced at either or both ends of the multimode fiber 40, 40', for example to form part of the optical fiber link. In some examples, the upgraded optical transmission system 10 supports a data rate of greater than 10 Gb/s, e.g., 16 Gb/s, 25 Gb/s or even higher.

As shown in FIG. 1A, according to some embodiments the optical system utilizes a multimode fiber (MMF) 40 that is suitable for both 850 nm multimode transmission, and LP01 mode transmission at a longer wavelength $μ_0$ (e.g., 980 nm, 1060 nm, 1310 nm or 1550. The MMF 40 of this embodiment is designed for high bandwidth (BW) at a wavelength $λ_1$ situated in 845 to 855 nm range (e.g., $λ_1$=850 nm). The fundamental mode (LP01) of MMF 40 has a mode field diameter (LP01 $MFD_{MM}$) that is approximately equal to that of a standard single mode fiber 50' such as SMF-28®, for example about 8.7-9.7 μm at 1310 nm, and about 9.8-10.8 μm at 1550 nm, and the MMF 40 preferably has a physical core diameter $D_{40}$ of about 13-30 μm (e.g., 15 μm≤$D_{40}$≤23 μm). When the MMF 40 is used for transmission in the optical transmission system 10' at 850 nm shown in FIG. 1A, the MM transmitter is coupled directly to the MMF. At the receiving end, the MMF 40 is coupled to a MM receiver.

Figure 1B:
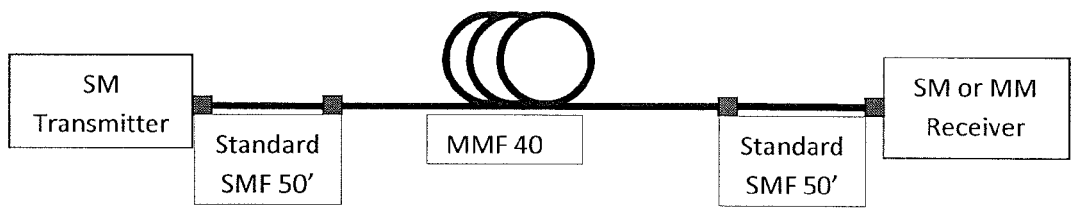
FIG. 1B is a schematic diagram of one embodiment of optical fiber transmission system that employs a single-mode transmitter and a singlemode or receiver optically connected by a multimode optical fiber 40.

When the MMF 40 of FIG. 1A is used for single mode transmission at a longer wavelength ($λ_0$>950 nm, for example 1060 nm, 1310 nm or 1550 nm) as shown in FIG. 1B, the SM transmitter may be coupled to a standard SMF 50' that is coupled to the MMF 40 (with center alignment). Because the MFD of the fundamental mode of the MMF 40 is approximately the same as the MFD of the standard SMF 50', light provided from SM source 20S (or from the SMF 50') to the MMF 40 is coupled into the fundamental mode LP01. At the receiving end, either a SM or a MM receiver can be coupled directly to the MMF 40, if no significant mode coupling loss occurs in the MMF. However, if mode coupling happens during propagation in the MMF 40, a standard SMF 50' can be placed as a filter between the MMF and the receiver, to strip the higher order modes.

Figure 2A:
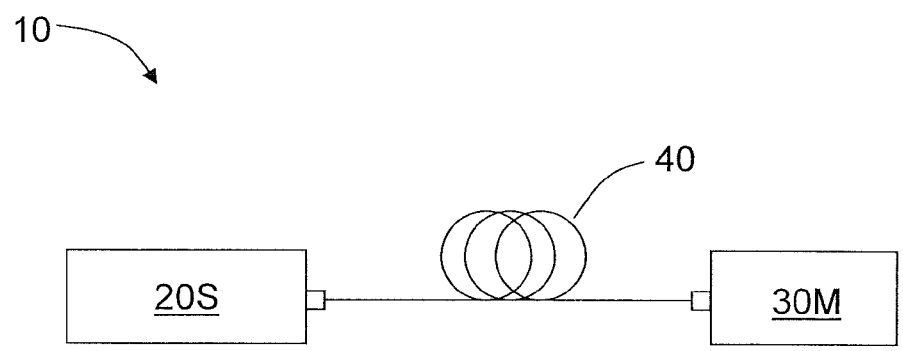
FIG. 2A is a schematic diagram of one embodiment of optical fiber transmission system that employs a single-mode transmitter and a multimode receiver optically connected by a multimode optical fiber.

FIG. 2A is a schematic diagram of an optical fiber transmission system ("system") 10 that employs a single-mode (SM) transmitter 20S and a multimode (MM) receiver 30M optically connected by a multimode optical fiber (MMF) 40 having a refractive index profile designed to optimally operate at a nominal wavelength of about 850 nm (i.e., has a "peak wavelength" in the 845 nm-855 nm range where mode dispersion is minimum). Because the MM optical fiber 40 described herein transmits optical signals at $λ_0$ wavelength in LP01 mode, the light launched from the SM transmitter 20S will propagate through the optical fiber 40, as if it was a single mode fiber.

Figure 2B:
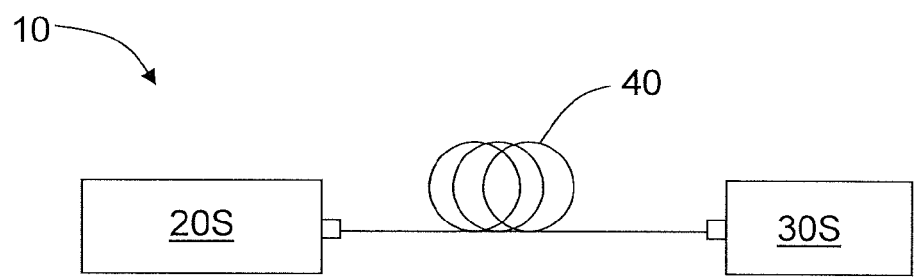
FIG. 2B is a schematic diagram of one embodiment of optical fiber transmission system that employs a single-mode transmitter and a single-mode receiver 30S optically connected by a multimode optical fiber.

FIG. 2B is similar to FIG. 2A but employs a SM receiver 30S. The SM transmitter 20S can be one that is used in an optical communications transceiver, such as an LR, or LRM transceiver. The MM receiver 30M can be one that is used in VCSEL-based transceivers or it can be a specially designed MM receiver. SM transmitter 20S emits modulated light 22, which in the example has a nominal wavelength $λ_0$ of at least 950 nm (e.g., 980 nm, 1060 nm, 1200 nm, 1310 nm, or 1550 nm). More generally, SM transmitter 20S emits light having a wavelength in the range from 950 nm to 1600 nm, and the systems and methods disclosed herein can have operating wavelengths in this range. In both embodiments of the optical transmission system 10 shown in FIGS. 2A and 2B, the SM fiber (not shown) can be coupled to the transiver 20, 30 and the multimode fiber, such that the MFD diameter of the SMF is approximately equal to that of the MMF, i.e., 0.7$MFD_{SM}$<LP01 $MFD_{MM}$<1.3$MFD_{SM}$ at wavelength $λ_0$. Preferably, 0.8$MFD_{SM}$<LP01 $MFD_{MM}$<1.2$MFD_{SM}$ at wavelength $λ_0$. In some embodiments 0.9$MFD_{SM}$<LP01 $MFD_{MM}$<1.1$MFD_{SM}$ at wavelength $λ_0$.

One embodiment of the optical system 10 is similar to that shown in FIG. 1B but instead of MMF 40 the optical system 10 includes an existing or "legacy" 850 nm MMF 40', such as existing OM2, OM3 or OM4 MM fiber with LP01 MFD in the range of 12-16 μm at wavelengths 950 nm to 1600 nm, with SM transceivers 20S operating at a wavelength $λ_0$ in the range from 950 nm to 1600 nm (and in particular at about 1060 nm (i.e., 1060 nm ±10 nm), or at about 1310 nm (i.e., 1310 nm±10 nm) or at about 1510 nm (i.e., 1510 nm±10 nm)) to transmit data within or between data centers over distances of 100 m to 1000 m with possible data rates of 10 Gb/s or higher (e.g., 25 Gb/s or higher, depending the system capability as limited by power budget and bandwidth of the MMF 40'). In this embodiment the SMF 50 is designed to be utilized with existing or "legacy" 850 nm MMF 40', such as existing OM2, OM3 or OM4 MM fiber. In this embodiment the MMF 40' is directly coupled to the SM fiber 50 that is structured to have a MFD diameter ($MFD_{SM}$) at the wavelength $λ_0$ such that 0.7$MFD_{SM}$<LP01 $MFD_{MM}$<1.3$MFD_{SM}$. In some embodiments 0.8$MFD_{SM}$<LP01 $MFD_{MM}$<1.2$MFD_{SM}$ μm, for example that 0.9$MFD_{SM}$<LP01 $MFD_{MM}$<1.1$MFD_{SM}$. The SMF 50 has a MFD in the 12-16 micron range (at wavelength $λ_0$ situated between 950 nm and 1600 nm), which is larger than the MFD of a standard SMF 50' (e.g., larger than the MFD of SMF-28®) at this wavelength. In some embodiments the core diameter ($D_{SM}$) of the SM fiber 50 that coupled to the existing OM2, OM3 or OM4 MM fiber 40' with the MFD of LP01 mode of about 12-16 μm at wavelength $λ_0$ situated in 950 nm and 1600 nm range is, for example, 15 to 23 μm.

Thus, in some embodiments embodiment the optical system 10 includes MMF 40', such as existing OM2, OM3, or OM4 MM fiber with 12-16 μm MFD at the wavelength $λ_0$, with SM transceivers 20S operating at a wavelength $λ_0$ in the range from 950 nm to 1600 nm (and in particular at about 980 nm (±10 nm), 1060 nm (±10 nm), 1310 nm (±10 nm) or 1510 nm (±10 nm)) to transmit data within or between data centers over distances of 100 m to 1000 m with possible data rates of 10 Gb/s or higher (e.g. 25 Gb/s or higher, depending the system capability as limited by power budget and bandwidth of the MMF 40'). In these embodiment the MMF 40' is directly coupled to the conventional SMF fiber 50 and the SMF 50 is structured to have a MFD diameter ($MFD_{SM}$) at the wavelength $λ_0$ such that 0.7$MFD_{SM}$<LP01 $MFD_{MM}$<1.3$MFD_{SM}$.

Note that in these embodiments the SM transmitter 30S discussed here can be one that is designed based on an existing standard to work with single mode fiber (SMF). Such a SM transmitter 30S can be modified for use with MMF to ensure better logistic management or compatibility with an existing installation. Note also that MMF 40' is designed for optimal operation at 850 nm but that the optical transmission system 10 operates at a nominal wavelength in the range from 950 nm to 1600 nm, for example at a nominal wavelength of about 980 nm, 1060 nm, 1310 nm, or 1550 nm.

Figure 3A:
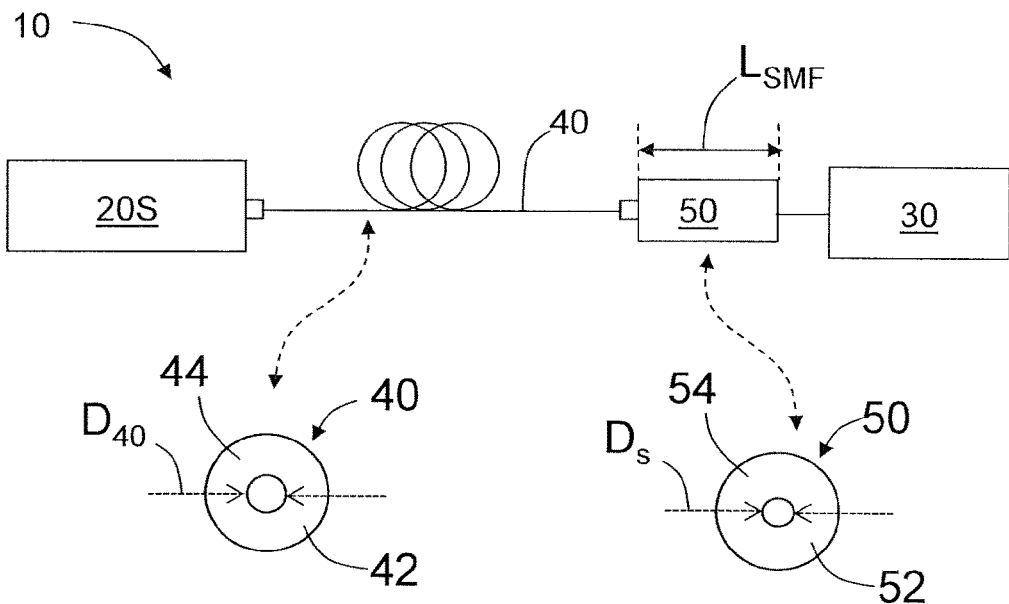
FIGS. 3A and 3B are schematic diagrams of other example embodiments of optical transmission systems.
Figure 3B:
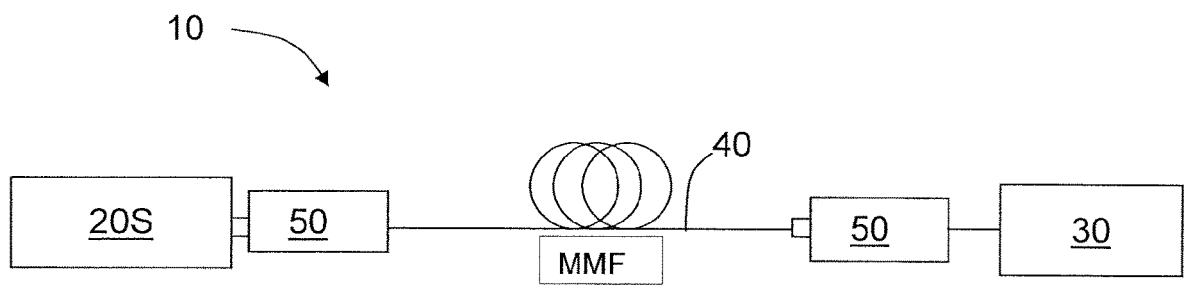

FIGS. 3A and 3B are schematic diagrams of example optical transmission systems 100 that are modified versions of systems 10 from FIGS. 2A and 2B, and are configured to reduce the detrimental effects produced by higher order modes, which have dramatically different group delay compared to that of the fundamental LP01 mode. With reference to FIG. 3A, system 10 includes either a single-mode or multimode receiver ("receiver") 30 and a single fiber 50, 50' arranged between MMF 40, 40' and receiver 30. In these embodiments the MMF 50 is coupled to the SMF 40', or MMF 50' is coupled to the SMF 40. FIG. 3B is similar to FIG. 3A and also includes a second single mode fiber 50, 50' between SM transmitter 20S and MMF 40. The two close-up insets of FIG. 3A show cross-sectional views of single mode fiber 50, 50' and MMF 40, 40'. Single mode fiber 50, 50' has a central core 52 surrounded by a cladding 54. The central core has a diameter $D_{SM}$. Single mode fiber 50, 50' preferably has a length in the range from 5 mm to 10 m. Multimode fiber 40, 40' has a core 42 of diameter $D_{40}$ surrounded by a cladding 44.

The core diameter $D_{SM}$ of the single mode fiber 50, 50' is smaller than the core diameter $D_{40}$ of MMF 40, 40'. The smaller core diameter $D_{SM}$ of the single mode fiber 50, 50' acts to filter out higher-order modes that can travel in MMF 40, 40'. While there is some modal loss, the light 22 from SM transmitter 20 that travels through system 10 will be limited to those modes that travel substantially down the center of the MMF 40, 40'.

Figure 4:
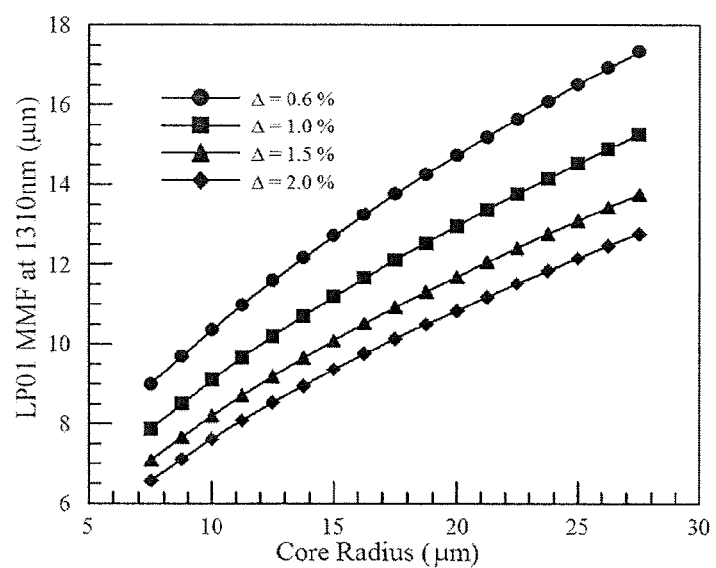
FIG. 4 illustrates MFD of the LP01 mode at 1310 nm wavelength of several exemplary multimode optical fiber embodiments vs. fiber core radii.

FIG. 4 illustrates LP01 MFD of MMFs 40 with a several exemplary core deltas versus core radii, at $\lambda_0=1310$ nm. For the purpose of the model shown in FIG. 4 we chose the core alpha of MMFs 40 to be 2.1 but the calculated LP01 MFDs vary very little for a range of alpha between 1.9 and 2.2, over the range of core radii illustrated in FIG. 4. For example, we looked at the MFDs when core delta of the MMFs 40 is 1.0%. It is known that a single mode fiber SMF-28®, produced by Corning Incorporated, of Corning N.Y. has nominal MFD of 9.2 μm for SMF-28® at 1310 nm. FIG. 4 illustrates that in order for the MMF 40 to match the MFD of 9.2 μm of the SMF-28® at $\lambda_0=1310$ nm such that $0.8 MFD_{SM} < LP01\ MFD_{MM} < 1.2 MFD_{SM}$ at $\lambda_0=1310$ nm, the core radius of the MMF 40 with 1% delta should be around 10 microns (core diameter $D_{40}$ should be around 20 microns). For example for a MMF 40 with a relative refractive core index delta of $\Delta=0.6\%$, the fiber should preferably have core diameter $D_{40}$ of about 15 μm, in order to have LP01 mode MFD that is approximately equal to the MFD of SMF-28® fiber. FIG. 4 also indicates that when the core delta of the MMF 40 is decreased, the core radius of the MMF 40 should be decreased in order for the LP01 $MFD_{MM}$ to approximately equal the MFD of SMF-28® at 1310 nm would (i.e., to enable the fiber to satisfy the following: $0.7 MFD_{SM} < LP01\ MFD_{MM} < 1.3 MFD_{SM}$ at $\lambda_0=1310$ nm). However, it we choose a MMF 40 with a core delta of 2.0%, the core diameter $D_{40}$ should be around 30 microns. Thus, FIG. 4 indicates that when the core delta of the MMF 40 is increased, the core radius of the MMF 40 should be increased. FIG. 4 illustrates that for any given core delta value of the MMF 40 we can choose a proper core diameter $D_{40}$ so that the MFD of the MMF 40 is approximately (±30%) equals the MFD of the fiber 50' (i.e., in this example MFD of SMF-28® fiber). Similar study can be done for single mode operation around 1550 nm, or for any other wavelength $\lambda_0$ of interest.

Figure 5:
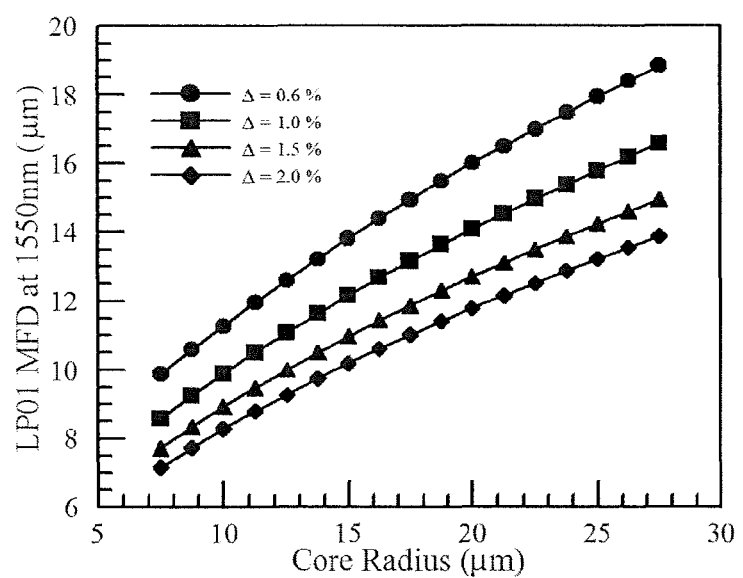
FIG. 5 illustrates MFD of the LP01 mode at 1550 nm wavelength of several exemplary multimode optical fiber embodiments vs. fiber core radii.

For example, the LP01 MFDs at $\lambda_0=1550$ nm wavelength, for different core radii of MMF 40, at several core deltas are shown in FIG. 5. To have the LP01 MFD match (in size) the nominal MFD of 10.3 μm for SMF-28® at 1550 nm, one can choose a core diameter of 22 microns with 1% core delta or 31 microns with 2% core delta. The above analysis shows that the core diameters for matching the MFDs of SMF-28® at both 1310 nm and 1550 nm are about the same for a given delta. One can choose an average diameter for matching MFDs of both 1310 nm and 1550 nm with a very small error. For example, for 1% core delta, the core diameter can be chosen to be about 21 μm, and for 2% delta, the core diameter can be chosen to be about 30.5 μm.

In some embodiments of the optical system 10, for 1310 nm operation, the single mode fiber SMF (as a SM pigtail fiber, for example) may be different from that of SMF-28® fiber, and in such case, given the MFD of this fiber, one can refer to FIG. 4 to find the core radius or diameter $D_{40}$ for a given core delta such that the MM fiber would have LP01 MFD that is similar to that of this SMF. This same MM fiber would also work reasonably well at 1550 nm.

For example, for 1% core delta, it is determined above that 20 micron core diameter would match the LP01 of SMF-28® at this wavelength. The same fiber has a LP01 MFD of 9.9 micron at 1550 nm, which is substantially similar to the 10.3 micron value for SMF-28®. In one further embodiment, one can choose to use one additional mode matching tapered single mode fiber to do mode conversion when needed.

If a smaller MMF core diameter is needed for certain applications, we can use a matching single mode fiber (i.e., a SMF with about the same MDF as that of the LP01 mode of the MMF) to work with it. For example, if we choose a core diameter of MMF 40 to be 30 μm for a core delta of 1%, the MFD of the LP01 mode is 11.2 μm at 1310 nm, which is larger than that of conventional SM fiber, such as SMF-28®. In this case we can use a single mode fiber 50 with the same or similar MFD to launch the LP01 mode. As an example, a step index single mode fiber design with delta of 0.25% and core radius of 5.3 μm has a MFD of 11.2 μm, which is the substantially the same as the MFD of LP01 mode of MMF 40.

Figure 6:
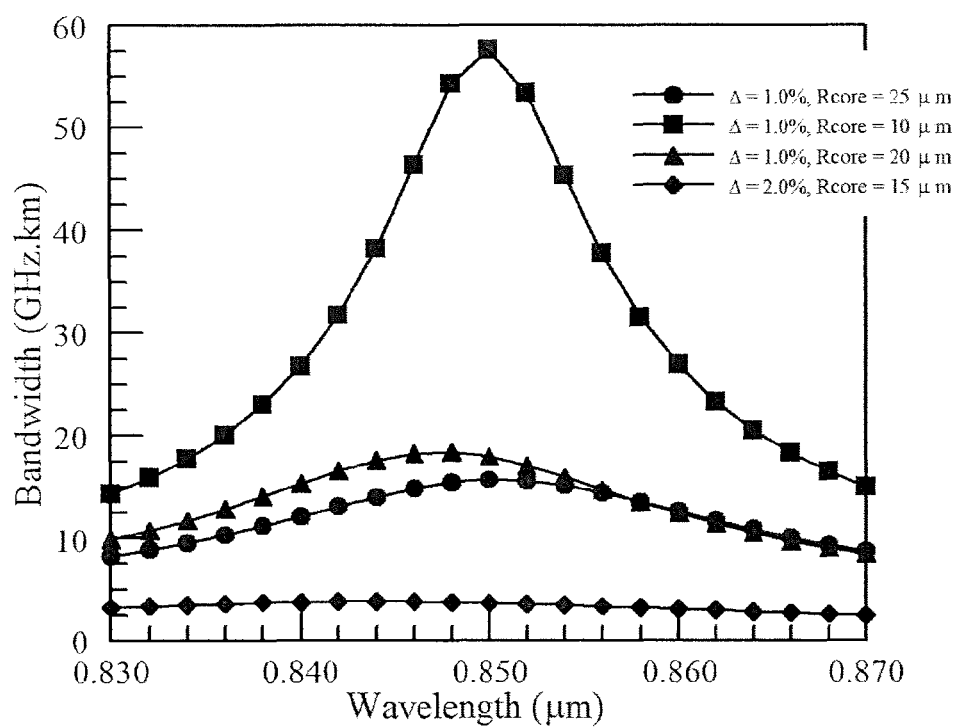
FIG. 6 shows bandwidth vs. wavelength for several exemplary MMFs.

While the exemplary MMF 40 is used for single mode or essentially single mode transmission at a long wavelength such as either 980 nm, 1060 nm, 1310 nm or 1550 nm, or any other wavelength>950 nm (or where $\lambda_0-\lambda_1<100$ nm) where a single mode transmitter is available, the exemplary MMF 40 is a multimode fiber for 850 nm VCSEL transmission, because most VCSELs to date operate around 850 nm. Preferably, the alpha value of the fiber core 42 of the MMF 40 is chosen so that the MM fiber's bandwidth performance around 850 nm is optimal. FIG. 6 shows bandwidth vs. wavelength for several MMFs. They have the alpha s within 1.9 to 2.3 range, for example of 2.096, 2.104, 2.098 and 2.092 respectively. The results of 50 micron core MMF with 1% are shown in FIG. 6 for comparison. It can be shown that with smaller core and the same 1% delta, the peak bandwidth can be increased dramatically because of fewer mode groups and smaller material dispersion effect. On the other hand, with 2% core delta, the maximum bandwidth is quite low. However the bandwidth the fiber with 2% core delta is still sufficient for some applications. In some embodiments the wavelength $\lambda_O$ is situated in 950 to 1070 nm wavelength band (e.g., 980 nm or 1060 nm wavelength), or 1260 nm to 1340 nm wavelength band, or 1540 nm to 1560 nm wavelength band.

Figure 7:
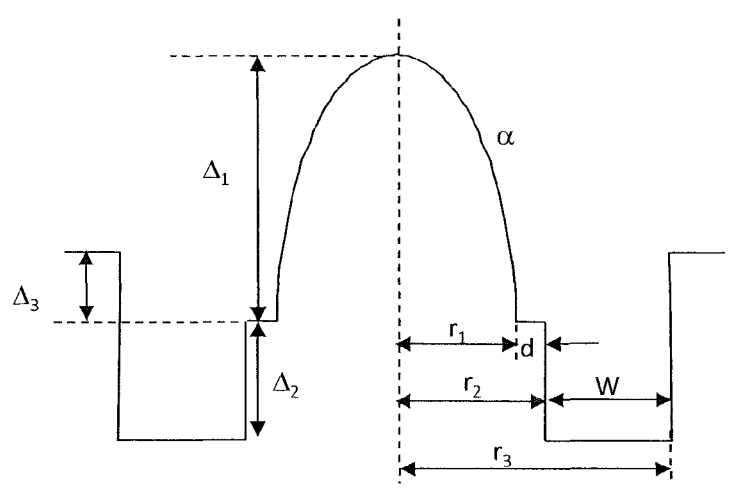
FIG. 7 illustrates schematically a refractive index profile of one exemplary MMF 40.

FIG. 7 illustrates the refractive index profile of one exemplary MMF 40. This MMF 40 has a graded index core with alpha around 2 (i.e., 2.09<α<2.13) in order to minimize the modal group delay to achieve high bandwidth at 850 nm. The multimode fiber 40 has a modal bandwidth of at least 2.5 GHz·Km at a wavelength $\lambda_1$ (e.g., $\lambda_1$=850 nm), preferably at least 5 GHz·Km, and according to some embodiments at least 10 GHz·Km. Preferably, according to some embodiments, the core has a relative refractive index delta $\Delta_1$ (%) of at least 0.7% at 850 nm wavelength, for example $0.7\% \leq \Delta_1 \leq 1.25$. Table 1 shows exemplary parameters of several embodiments of the MMF 40 (fiber Examples 1-5). All embodiments of MMF 40 shown in Table 1 have MFDs in the range of 9.1 µm to 9.3 µm, which is within 30% of the MFD of standard single mode fibers 50' such as SMF-28®, which has MFD of 9.2 µm at 1310 nm. The theoretical bandwidths of the MMFs are greater than 58 GHz·km, which are much higher than that of the standard MMFs due to fewer mode groups propagating in the MMFs 40. In these exemplary embodiments 15 µm≤$D_{40}$≤23 µm and the multimode fiber 40 has a modal bandwidth of at least 2.5 GHz·Km at a wavelength $\lambda_1$ and less than 2 GHz·Km at a wavelength $\lambda_0$≥1200 nm.

TABLE 1

MMF 40 design examples

|  | Example 1 | Example 2 | Example 3 | Example 4 | Example 5 |
|---|---|---|---|---|---|
| $\Delta_1$ (%) | 0.75 | 0.75 | 0.9 | 1.0 | 1.2 |
| α | 2.109 | 2.108 | 2.106 | 2.106 | 2.106 |
| $r_1$ (µm) | 9.1 | 9.0 | 9.9 | 10.5 | 11.4 |
| $\Delta_2$ (%) | 0 | −0.4 | 0 | 0 | na |
| $r_2$ (µm) | na | 10.2 | na | na | na |
| D (µm) | na | 1.2 | na | na | na |
| $\Delta_3$ (%) | na | −0.4 | na | na | 0.2 |
| $r_3$ (µm) | na | 15.0 | na | na | 22.3 |
| W (µm) | na | 4.8 | na | na | 10.9 |
| 850 nm BW (GHz · km) | 20.6 | 48.7 | 20.2 | 10.9 | 30.8 |
| 1200 nm BW (GHz · km) | 1.7 | 2.2 | 2.3 | 1.1 | 1.4 |
| MFD @1310 nm (µm) | 9.1 | 9.2 | 9.3 | 9.3 | 9.3 |
| MFD @1550 nm (µm) | 10.2 | 10.1 | 10.1 | 10.1 | 10.1 |

Figure 8:
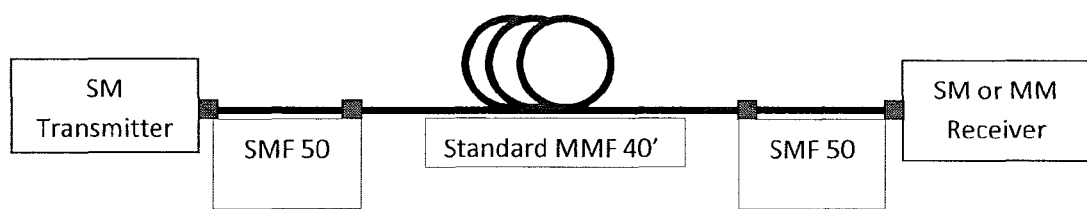
FIG. 8 is a schematic diagram of one embodiment of optical fiber transmission system that employs a single mode transmitter optically connected by a multimode optical fiber 40', and SM fiber jumper(s) comprising SMF 50.

As discussed above, according to another embodiment, a single mode fiber 50 (fiber jumper 50) can be used to upgrade existing systems using 850 nm standard MMF 40' to single mode transmission at 1310 nm or 1550 nm. A standard MMF 40' with 1% delta has a MFD of 14.6 µm at 1310 nm, and 15.8 µm at 1550 nm, and a standard MMF 40' with 2% delta has a MFD of 13.8 µm at 1310 nm, and 15.0 µm at 1550 nm, which are much larger than the MFDs of standard SMF 50'. If a standard SMF 50' is used as a jumper at 1310 or 1550 nm, the MFD mismatch between MMF 40' and SMF 50' will excite higher order optical modes, which will degrade the system's performance. This problem can be solved by using specially designed SMF 50 jumpers as shown in FIG. 8.

Some exemplary embodiments of SMFs 50 with MFDs that are similar to that of standard MMFs 40' are described below in Table 2, which provides parameters of SMF embodiments 50. The Example 6 fiber has a profile design with a depressed inner cladding surrounding the core. It has a cutoff wavelength of 1288 nm. This SM fiber 50 can be used on transmission system 10 operating at 1310 nm or a 1550 nm wavelength $\lambda_0$. If a SM fiber 50 is used only for 1550 nm, its cutoff wavelength can be increased to improve the bending loss. In SM fiber 50 of Example 7, the cutoff wavelength is increased to 1466 nm by increasing the core delta. Example 8 SM fiber 50 has a profile design with a low index trench in the cladding. SM fibers 50 of Examples 7-8 are designed for matching the standard MMF with 1% core delta and 50 µm core diameter. SM fiber 50 of Examples 9-10 are designed for matching standard MMF with 2% core delta and 62.5 µm core diameter. Example 9 SM fiber 50 has a depressed inner cladding and Example 10 has an updoped outer cladding.

TABLE 2

SMF 50 design examples

|  | Example 6 | Example 7 | Example 8 | Example 9 | Example 10 |
|---|---|---|---|---|---|
| $\Delta_1$ (%) | 0.12 | 0.14 | 0.13 | 0.135 | 0.24 |
| α | 20 | 20 | 20 | 20 | 20 |
| $r_1$ (µm) | 9.0 | 9.4 | 7.9 | 8.4 | 11.4 |
| $\Delta_2$ (%) | −0.1 | −0.1 | −0.2 | −0.12 | 0 |
| $r_2$ (µm) | 9.0 | 9.4 | 12.0 | 8.4 | 8.4 |
| d (µm) | 0 | 0 | 4.1 | 0 | 0 |
| $\Delta_3$ (%) | 0 | 0 | −0.2 | 0 | 0.2 |
| $r_3$ (µm) | 19 | 19.9 | 19.2 | 17.9 | 15.4 |
| W (µm) | 10 | 10.5 | 7.2 | 9.5 | 4 |
| Cutoff wavelength (nm) | 1288 | 1466 | 1306 | 1279 | 1301 |
| MFD @1310 nm (µm) | 14.6 | na | 14.6 | 13.7 | 13.7 |
| MFD @1550 nm (µm) | 15.7 | 15.8 | 15.7 | 14.7 | 14.8 |

Table 3 shows exemplary parameters of several embodiments of SMF 50, designed for use with a MM fiber 40' that can operate at both 850 nm wavelength, and are capable of propagation LP01 propagation at 1060 nm. Thus, the embodiments of the fibers 50 (Example 11 and Example 12 fibers) shown in Table 3 can be used in the optical transmission system 10 in conjunction with such MMF.

TABLE 3

|  | Example 11 | Example 12 |
|---|---|---|
| $\Delta_1$ (%) | 0.095 | 0.085 |
| α | 20 | 20 |
| $r_1$ (µm) | 8.2 | 7.9 |
| $\Delta_2$ (%) | −0.1 | −0.1 |
| $r_2$ (µm) | 8.2 | 7.9 |
| d (µm) | 0 | 0 |
| $\Delta_3$ (%) | 0 | 0 |
| $r_3$ (µm) | 17.4 | 16.8 |
| W (µm) | 9.2 | 8.9 |
| Cutoff wavelength (nm) | 1030 | 936 |
| MFD @980 nm (µm) | na | 12.6 |
| MFD @1060 nm (µm) | 13.1 | 13.0 |

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

Unless otherwise expressly stated, it is in no way intended that any method set forth herein be construed as requiring

What is claimed is:

1. An optical transmission system, comprising:
a single-mode transmitter that emits modulating light having an operating wavelength $\lambda_O$ in the range between 950 nm and 1600 nm;
an optical receiver configured to receive and detect the modulated light; and
an optical pathway between the single-mode transmitter and the optical receiver, the optical pathway comprising first and second optically coupled optical fibers, wherein the first optical fiber is a single mode fiber at the wavelength in the range between 950 nm and 1600 nm and has a cutoff wavelength $\lambda_{SM}<1600$ nm, and wherein the second optical fiber is a multimode fiber structured for multimode transmission at a wavelength $\lambda 1$ situated between 840 nm and 860 nm, and wherein the second optical fiber comprises:
a core with a diameter $D_{40}$,
a cladding surrounding the core;
a refractive index profile defined by the core and the cladding and that defines an optimal multimode transmission at the wavelength $\lambda_1$ situated between 840 nm and 860 nm, the second optical fiber being structured to be capable of a single mode transmission in an LP01 mode at an operating wavelength $\lambda_O>950$ nm;
the LP01 mode having a mode field diameter $LP01MFD_{MM\lambda_O}$ in the range 8.5 $\mu m<LP01MFD_{MM\lambda_O}<11$ $\mu m$ at the operating wavelength $\lambda_O$;
a cutoff wavelength>1600 nm; and
a modal bandwidth of at least 2.5 GHz·Km at the wavelength $\lambda_1$.

2. An optical transmission system comprising:
a single-mode transmitter that emits modulating light having an operating wavelength $\lambda_O$ in the range between 950 nm and 1600 nm;
an optical receiver configured to receive and detect the modulated light; and
an optical pathway between the single-mode transmitter and the optical receiver, the optical pathway comprising first and second optically coupled optical fibers, wherein the first optical fiber is a single mode fiber at the wavelength in the range between 950 nm and 1600 nm and has a cutoff wavelength $\lambda_{SM}<1600$ nm, and wherein the second optical fiber is a multimode fiber structured for multimode transmission at a wavelength $\lambda 1$ situated between 840 nm and 860 nm, wherein the second optical fiber comprises:
a core with an alpha value of $2.09 \leq \alpha \leq 2.2$ and a diameter $D_{40}$, wherein 15 $\mu m \leq D_{40} \leq 40$ $\mu m$;
a cladding surrounding said core, and a depressed index region situated within said cladding;
a maximum relative refractive index delta $\Delta_1(\%)$, wherein $0.7\% \leq \Delta_1 \leq 2\%$;
a multimode light transmission at a first wavelength $\lambda_1$, wherein $840 \leq \lambda_1 \leq 860$ nm;
a single mode light transmission in an LP01 mode at a second wavelength $\lambda_O$, wherein 950 nm$\leq \lambda_O \leq 1600$ nm; and
wherein the LP01 mode has a LP01 mode field diameter $LP01MFD_{MM\lambda_O}$ at the second wavelength $\lambda_O$ such that 8.5 $\mu m<LP01MFD_{MM\lambda_O}<11$ $\mu m$.

3. The optical transmission system according to claim 1, wherein the single mode transmitter comprises a vertical cavity surface emitting laser (VCSEL).

* * * * *